(12) United States Patent  (10) Patent No.: US 7,119,844 B2
Misawa  (45) Date of Patent: Oct. 10, 2006

(54) DIGITAL CAMERA

(75) Inventor: Takeshi Misawa, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 932 days.

(21) Appl. No.: 10/154,981

(22) Filed: May 28, 2002

(65) Prior Publication Data
US 2002/0191088 A1 Dec. 19, 2002

(30) Foreign Application Priority Data
May 31, 2001 (JP) ............. P.2001-164720

(51) Int. Cl.
H04N 5/225 (2006.01)
H04N 5/76 (2006.01)
(52) U.S. Cl. .................. 348/375; 348/373; 348/231.9
(58) Field of Classification Search ............. 348/373, 348/375, 231.9; 386/117; 713/194
See application file for complete search history.

(56) References Cited

U.S. PATENT DOCUMENTS 5,400,185 A * 3/1995 Scerbo, III ............... 360/5
6,957,011 B1 * 10/2005 Mitchell .................. 386/117
6,992,701 B1 * 1/2006 Okada .................... 348/211.3
2002/0180873 A1 * 12/2002 Misawa ................... 348/231.6

FOREIGN PATENT DOCUMENTS

JP 08082840 A * 3/1996
JP 2000228740 A 8/2000

* cited by examiner

Primary Examiner—Lin Ye
(74) Attorney, Agent, or Firm—Sughrue Mion, PLLC

(57) ABSTRACT

On the external packing film 124 of the memory card insertion section vicinity of the bottom surface of the digital camera 100, the ROM chip and the print wiring 131 are surface-mounted, and one end of the print wiring 131 is connected to the ROM chip 130, and the other end is connected to the external connecting terminal 132 provided on the bottom surface of the digital camera 100. The identifying information in the ROM chip 130 is read out at the time of the operation of the digital camera 100, and is collated with the identifying information inside the camera, and when it can not be collated or it is not coincident, the power source of the camera is compulsively turned off.

8 Claims, 7 Drawing Sheets

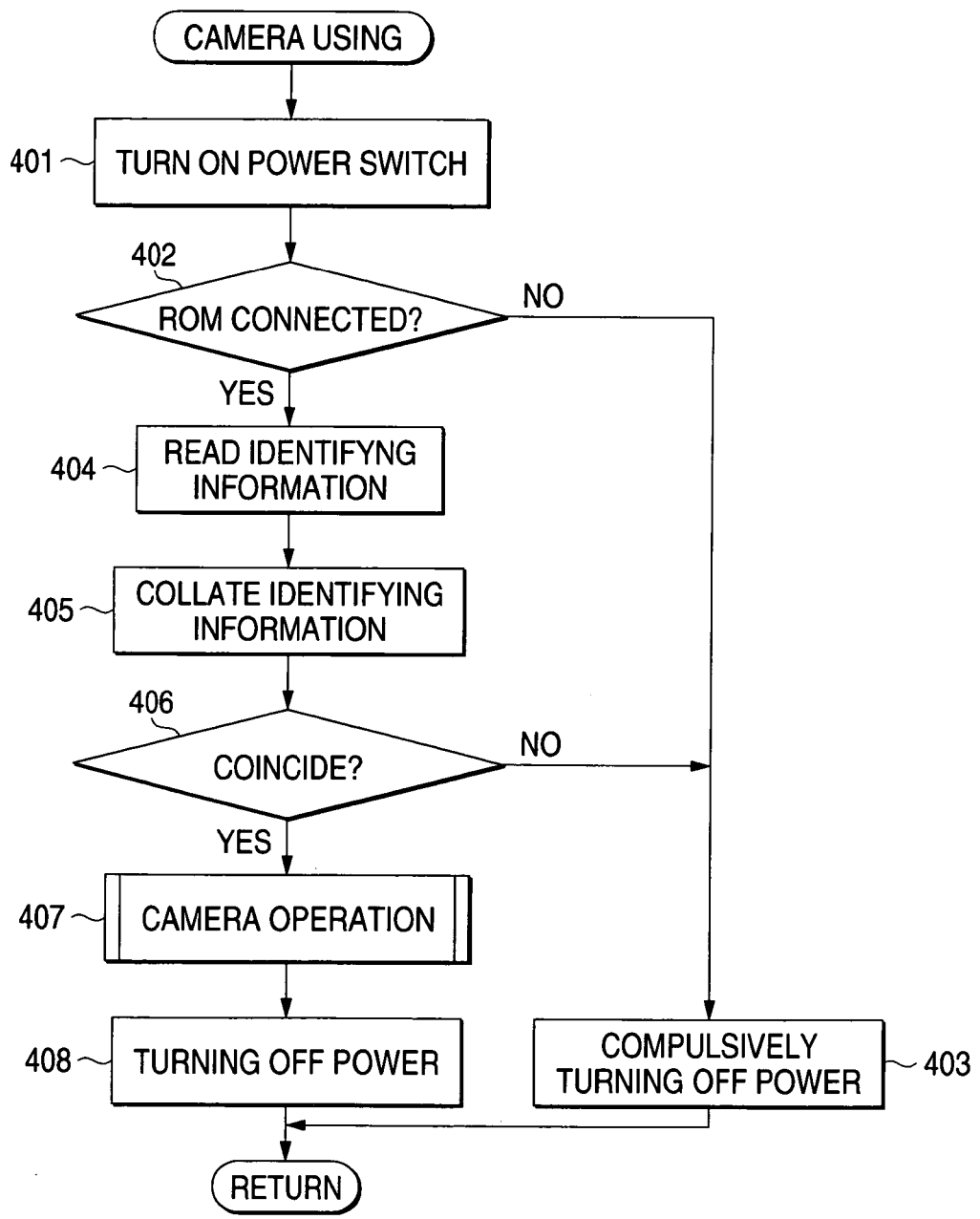

DIGITAL CAMERA

BACKGROUND OF THE INVENTION

1. Field of the Invention

The present invention relates to a digital camera, and particularly to a digital camera which is appropriate for an easy use.

2. Description of the Related Art

At a visit location, when it hurriedly becomes necessary to take a picked up image, there are many cases where a lens-fitted film unit is used. Because a lens-fitted film unit can be easily obtained in a retail shop or an automatic vending machine, even when a camera is not always carried with the person, the desired image can be photographed as necessary, and the recording can be remained.

On the one hand, a digital camera in which the digital image information obtained by an image pick-up element is recorded in a built-in memory or removable recording medium (hereinafter, sometimes simply denoted as "medium"), is widespreadingly used. In such a digital camera, in the same manner as the conventional camera, it has a feature that, not only a photographic print according to the obtained image information can be obtained, but further the digital image information is taken into a personal computer and various processing can be conducted on it. Therefore, also for the digital camera, in the same manner as the lens-fitted film camera, it is expected that it can be easily obtained in a retail shop or automatic vending machine, and a system by which a print of the photographed image and digital image information can be obtained in a low cost, is spread.

However, in the digital camera, because many electronic parts are necessary, it is difficult to produce in a low cost, specifically it requires more cost in order to guaranty the performance of the long period, a system is considered in which, after a predetermined exposures are photographed, the photographed digital camera is withdrawn and recycled. When it is not withdrawn after the predetermined exposure photographing, the digital camera is used for a long period of time, and because the quality of the photographed image can not be guaranteed, it is important in this system that the withdrawal efficiency is increased. Further, when the withdrawal efficiency is increased, by using the withdrawn digital camera for the re-production, the production cost can be reduced.

As the digital camera for increasing the withdrawal efficiency, for example, a camera is proposed which is disclosed in Japan Patent Laid Open 2000-228740. This digital camera employs a system by which the digital image information is stored in an internal memory, and the access to the internal memory is limited by a password. The password is stored in the camera at the time of production of the digital camera, and is controlled by the manufacturer. Accordingly, because the user of this camera can not freely use the digital image information, the user end up bringing the camera to a lab, and the withdrawal efficiency is increased as a result.

However, when the access to the digital image information is limited by the password, the control of the password by the manufacturer and the password acquisition at the image information utilization point such as a lab, are necessary, and the control burden to maintain the withdrawal system is large. Further, because it can not be used for the digital camera in which the medium is used, the processing based on the digital image information and the re-production of the digital camera can not be conducted in parallel, and the efficiency of the re-production is not increased.

SUMMARY OF THE INVENTION

A first aspect of the invention is directed to a digital camera including a removable recording medium for recording a picked up image information, a ROM connected to an external connecting terminal of the digital camera and storing first identifying information an identifying information memory section which is provided inside of the digital camera and storing second identifying information, a collating section for collating the first identifying information with the second identifying information, and an operation limiting section compulsorily stopping operation of the digital camera in a case a collating result by the collating section is not coincident with each other. This digital camera is characterized by that the ROM is arranged in a condition that the connection to the external connecting terminal is broken in a case the removable recording medium is taken out. When such a structure is applied, because the connection of the ROM with the digital camera main body is broken when the recording medium in which the photographed image information is recorded, is taken out, even when the recording medium is mounted again, the digital camera can not be operated.

A second aspect of the invention is directed to the digital camera further including an external packing film which covers at least a mounting portion of the removable recording medium, a bare chip of the ROM and wiring to the external connecting terminal are surface-mounted on the camera side surface of the external pacing film so that the mounting portion of the removable recording medium is covered. The digital camera is characterized by that the external packing film has an adhered portion adhered to the digital camera surface in the vicinity of the mounting position of the bare chip and the wiring. In the case where such a structure is applied, when the external packing film is taken off in order to take out the recording medium, the connection of the ROM with the digital camera main body is broken, and the digital camera can not be operated again.

A third aspect of the present invention is directed to a digital camera including an internal memory for recording picked up image information, an input and output interface section which can transmit the recorded picked up image information to the outside a ROM storing first identifying information, and connected to an external connecting terminal of the digital camera, an identifying information memory section provided in the digital camera and storing second identifying information, a collating section to collate the first identifying information with the second identifying information, and an operation limiting section by which an operation of the digital camera is compulsively stopped in a case a collation result by the collating section does not coincide with each other. The digital camera is characterized by that the ROM is arranged in a condition that the connection to the external connecting terminal is broken in a case the recorded picked up image information is transmitted. In the case where such a structure is applied, when the photographed image information is taken from the internal memory, the connection of the ROM to the digital camera main body is broken, and the digital camera cannot be operated again.

A forth aspect of the present invention is directed to the digital camera according to the third aspect of the invention, further including an external packing film which covers at least the input and output interface section, and a bare chip of the ROM and a wiring to the external connecting terminal are surface-mounted on the position covering the input and output interface section on the camera side surface of the external packing film. The digital camera is characterized by that the external packing film has a camera adhering section to be adhered to the digital camera surface in the vicinity of the mounting position of the bare chip and wiring.

In the case where such a structure is applied, when the photographed image information is taken from the internal memory, the connection of the ROM to the digital camera main body is broken, and the digital camera can not be operated again.

The external packing film in the digital camera of the present invention is structured in such a manner that at least one portion is more easily broken than the other portion in the vicinity of the adhered portion and in the vicinity of the mounting position of the wiring. When such a structure is applied, the connection of the ROM to the digital camera main body can be surely broken.

The bare chip of the ROM and the wiring to the external connecting terminal in the digital camera of the present invention are mounted on the mounting film which is thinner than the external packing film, and the mounting film is adhered onto the external packing film. When such a structure is applied, while the strength of the external packing film is made appropriate for the external packing, the connection of the ROM to the digital camera main body can be surely broken.

Further, the second identifying information in the digital camera of the present invention is read from the ROM after the digital camera is produced, and stored in the identifying information memory section. When such a structure is applied, the control of the first and the second identifying information having a predetermined relationship becomes easy.

Further, in the digital camera of the present invention, as the second identifying information to be stored, the first identifying information is used. When such a structure is applied, the identifying information stored in the ROM can be arbitrary one, and the collation processing becomes simple.

Further, the reading of the second identifying information from the ROM in the digital camera of the present invention and the storing into the identifying information memory section are conducted by using a predetermined program, and the program is erased after the storing into the identifying information memory section. When such a structure is applied, the reproduction by using a new ROM chip becomes difficult, and the increase of the withdrawal efficiency can be expected.

Further, as the ROM in the digital camera of the present invention, an electrically erasable ROM is used, and the reading program of the second identifying information from the ROM, and the storing program into the identifying information memory section are previously stored in the ROM. When such a structure is applied, the program storing memory of the digital camera itself can be structured by a low cost ROM.

BRIEF DESCRIPTION OF THE DRAWINGS

FIG. 4 is a view sowing an outline operation flow at the time of a use of the digital camera.

DESCRIPTION OF THE PREFERRED EMBODIMENTS

Figure 1A:
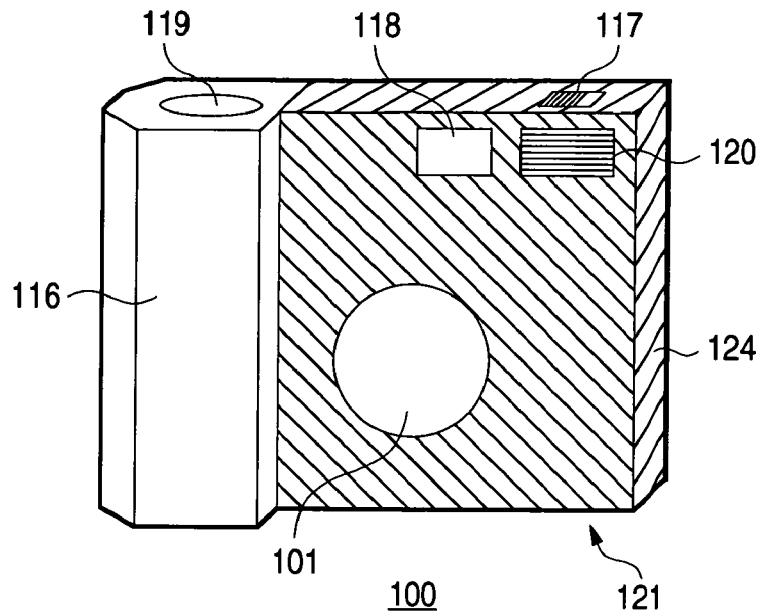
FIGS. 1A to 1C are outline appearance views of a digital camera of the first embodiment.

Referring to the drawings, embodiments of the present invention will be described below.

(The First Embodiment)

Figure 1B:
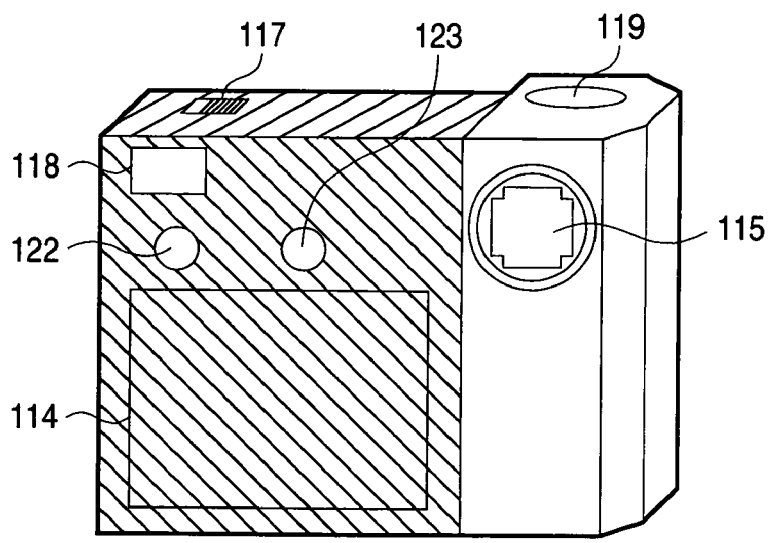
Figure 1C:
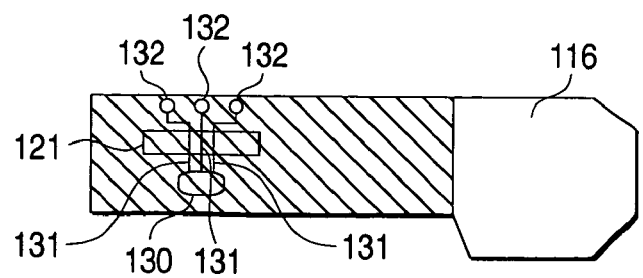

FIGS. 1A to 1C are appearance general views of a digital camera of the first embodiment, and FIG. 1A shows its front view, FIG. 1B shows its rear surface, and FIG. 1C shows its bottom surface. A digital camera 100 is structured by comprising a casing 116, power switch 117, optical view finder 118, photographing lens 101, shutter button 119, auxiliary light light-emitting section 120, memory card insertion section 121, display 114, operation switch 115, menu switch 122, execution/image plane change over switch 123, external packing film 124, ROM chip 130, print wiring 131, and external connecting terminal 132.

The external packing film 124 is packed to protect the memory card insertion section 121, and display 114, and to structurally reinforce the main body. The external packing film 124 at least covers the memory card insertion section 121, and when the memory card 112 is taken out after the photographing, it is stripped off. On the one hand, in the re-production process, the camera is packed by a new external packing film 124.

On the camera side surface of the external packing film 124, a ROM chip 130 and print wiring 131 are mounted. One end of the print wiring 131 is connected to the ROM chip 130, and the other end is connected to the external connecting terminal 132 provided on the bottom surface of the digital camera 100. Accordingly, the data of the ROM chip 130 can be taken into the digital camera 100. Further, as will be described later, the print wiring 131 is arranged in such a manner that, when the external packing film 124 is stripped off to take out the memory card 112, it is broken.

Herein, each element, except for a slide switch necessarily being exposed outside (power switch 117), can be covered by the external packing film 124. For example, the auxiliary light light-emitting section 120, optical view finder 118 and photographic lens 101 are covered by a transparent portion, having no print, of a film whose transparency is high. When only the switch location is known, even when a push-switch such as the menu switch 122, and execution/image plane change over switch 123 is covered, the operation is not influenced. Because of that, the indication may be made so that its location is understood, or the switch may be covered by a portion made as a transparent window. However, when the switch is protruded, it is necessary that the film is expanded so that the tension does not affect the film. The surface of the display 114 is covered by the transparent material such as the glass or acrylic resin, but even by this, because there is a problem that it is flawed, it is preferable that this portion is also covered by the film having the high transparency.

Figure 2:
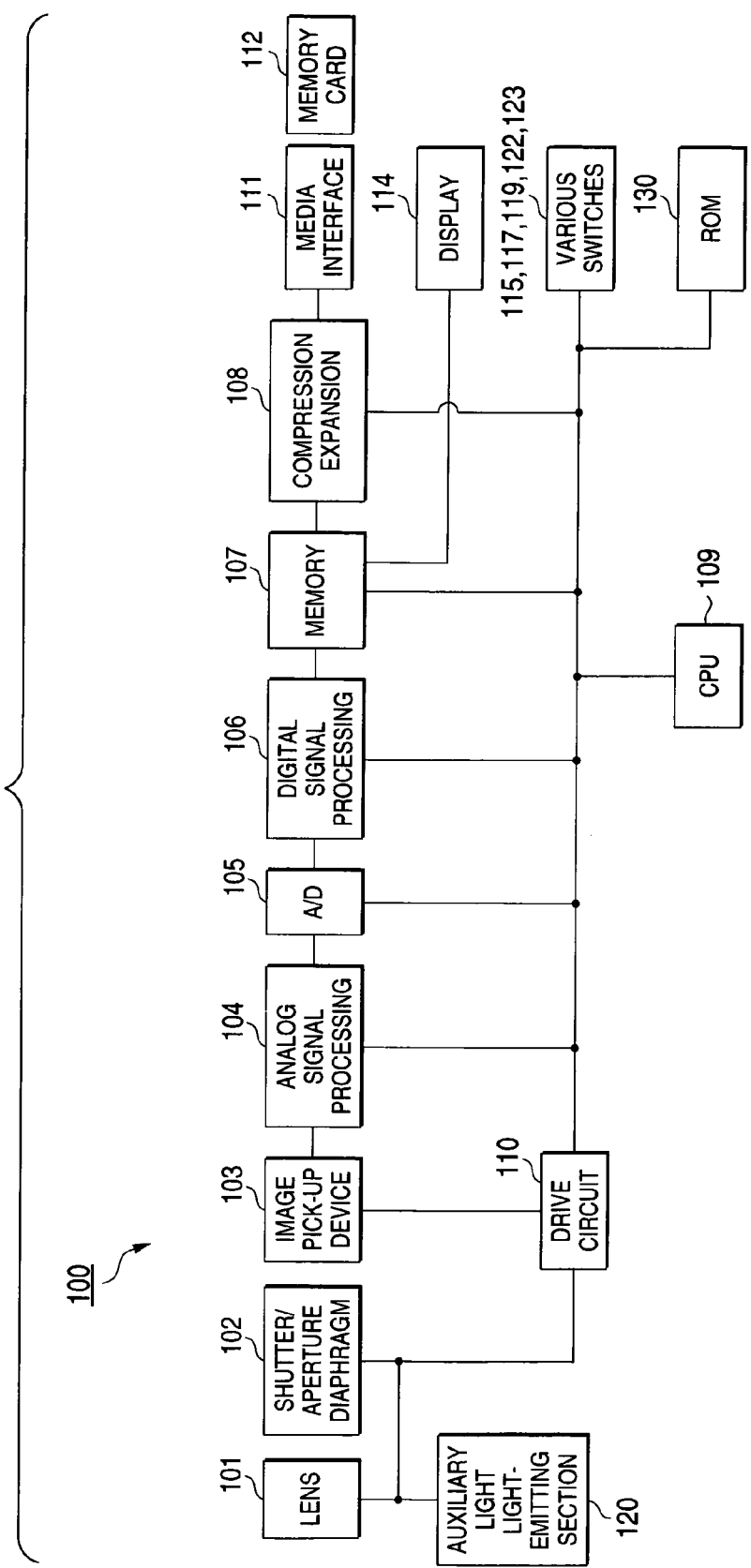
FIG. 2 is an outline block structural view of the digital camera of the first embodiment.

FIG. 2 is an outline block structural view of the digital camera 100 of FIGS. 1A to 1C. The digital camera 100 is structured by comprising a photographic lens 101, shutter/ aperture diaphragm 102, image pick-up device 103, auxiliary light light-emitting section 120, and image pick-up section including a drive circuit 110, analog signal processing section 104, A/D conversion section 105, digital signal processing section 106, output memory 107, and signal processing section including compression expansion processing section 108, media interface 111 and output section including a display 114, operation switch 115, power switch 117, shutter button 119, menu switch 122, operation section including an execution/image plane change over switch 123, and CPU 109 by which the whole of the digital camera is controlled. On the media interface 111, the memory card 112 which is a removable recording medium in which the picked up image information is recorded, can be mounted.

Because the structure of the image pick-up section and the signal processing section is the same as the conventional digital camera, it will be briefly described. The light passing the lens 101 and shutter/aperture diaphragm 102 is focused on the image pick-up device 103 such as the CCD, and the picked up image signal is obtained. Herein, the shutter prevents a smear generation when a signal is read from the image pick-up device 103. The image pick-up device 103 is driven by the drive circuit 110 at a predetermined timing with an operation of the shutter button 119 as a trigger, and outputs the image signal. The drive circuit 110 can also be omitted depending on the drive voltage condition of the image pick-up device 103.

The image signal is A/D converted after the analog signal processing, and temporarily stored in the output memory 107 through a digital signal processing. Herein, when it is displayed on the display 114, the content of the output memory 107 is read out, and is sent to the display 114. The picked up image of the output memory 107 is compression processed in the compression expansion processing section 108, and recorded in the memory card 112 through the media interface 111. The compression processing can also be omitted depending on the photographic mode.

When the image recorded in the memory card 112 is displayed on the display 114, the image information read from the memory card 112 is compression processed in the compression expansion section 108, and written into the output memory 107, and sent to the display 114.

These operations are conducted under the control of the CPU 109 which is operated by a predetermined program, corresponding to the condition of each kind of switch including the power switch 117, operation switch 115, menu switch 122, execution/image plane change over switch 123, and shutter switch (not shown) operated by the shutter button 119. In this connection, the memory in which the program is stored, work memory, and identifying information memory section in which the second identifying information which will be described later, is stored, are not shown in the drawing.

As the ROM chip 130, for example, a serial ROM is used, and in which the first identifying information and the second identifying information for controlling the operation of the digital camera are previously stored. The first identifying information and the second identifying information have a predetermined relationship, and it may be the same information. When it is the same information, only the first identifying information is stored, and the first identifying information is read out as the second identifying information.

Next, the use of the first and the second identifying information stored in the ROM chip will be described. At the time of the production or re-production of the digital camera 100, which will be described later, the identifying information registration processing in which the second identifying information stored in the ROM chip 130 is stored into the identifying information memory section (not shown), is conducted after the assembly and before the delivery. The registration processing is conducted when a predetermined program is executed by the CPU 109 upon a special operation of the switches (for example, the simultaneous operation of switches 122, 123, and the shutter button 119).

Figure 3:
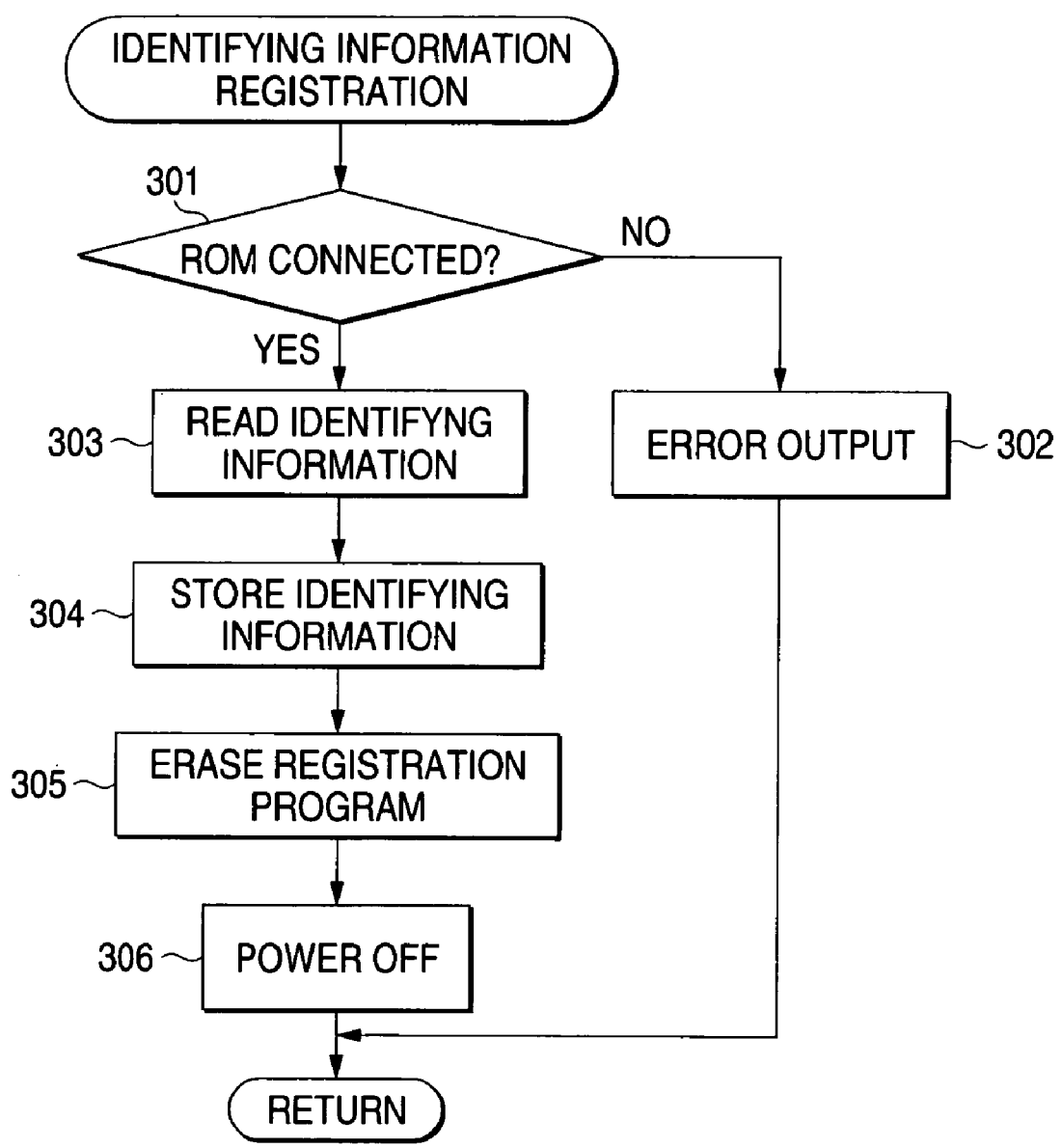
FIG. 3 is a view showing an outline operation flow at the time of an identifying information registration.

In FIG. 3, an outline operation flow at the time of the identifying information registration is shown. When the registration of the identifying information is commanded, it is checked whether the ROM 130 is connected to the external connecting terminal 132 (step 301). When it is not connected, it is judged as the poor production, and the error output is conducted (step 302). In the error output, for example, an error indication is displayed on the display 114.

When the ROM 130 is connected, the second identifying information is read from the ROM 130 (step 303), and the read identifying information is stored in the identifying information memory section (not shown) (step 304). Then, a program, which conducts the registration processing, is erased (step 306), and the power is turned off (step 306), and the registration processing is completed.

In this connection, the reason for erasing the program is to limit that the person except for the specified person such as a manufacturer conducts the registration processing. The registration program may be stored in the digital camera 100 inside, however, it is stored in the ROM 130, when the registration information is commanded, the registration program may also be read and executed. Further, when the registration program is stored in the ROM 130, and it is erased after the registration processing, the electrically erasable ROM is used as the ROM 130.

Successively, the operation at the time of the use of the digital camera 100 will be described. FIG. 4 is a view showing an outline flow of the time of the use of the camera. When the power switch is turned on (step 401) at the time of start of the use, it is checked whether the ROM 130 is connected to the external connecting terminal 132 in step 402 (step 402). When it is not connected, it is judged that the use of the digital camera is completed, and the power source is compulsively turned off (step 403), and it is made unusable.

When the ROM 130 is connected, the first identifying information is read from the ROM 130, and the second identifying information is respectively read from the identifying information memory section (not shown) (step 404), and these are collated with each other (step 405). When the collation result is not coincident with each other, it is judged that the use of the digital camera 100 is completed, and the power source is compulsively turned off (step 403), and it is made unusable. When the collation is coincident with each other, the operation of the camera is successively possible, and the desired operation can be conducted in step 407. In this connection, herein, "the collation is coincident" not only means that identifying information of the two are the same, but includes also a case where it has a predetermined relationship. Then, when the operation of the camera is completed, the power source switch 408 is turned off (step 408).

Figure 5A:
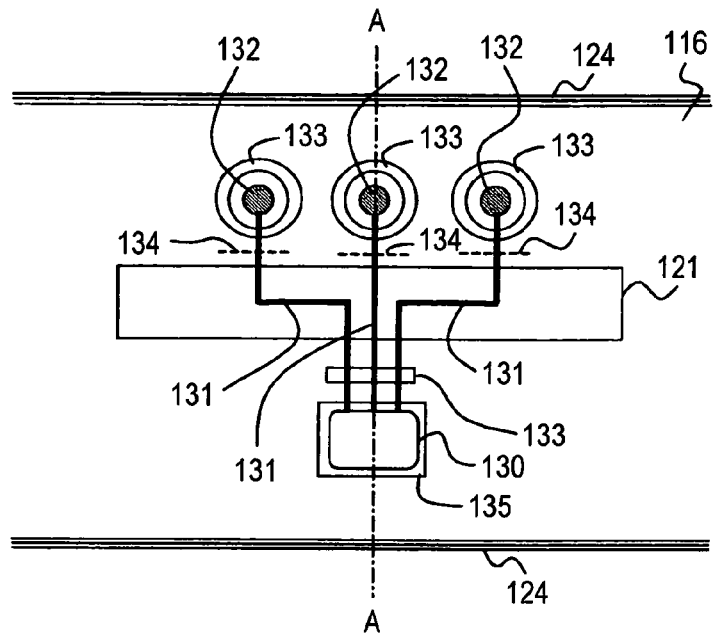
FIGS. 5A and 5B are views enlargedly showing the vicinity of a ROM chip of the digital camera.
Figure 5B:
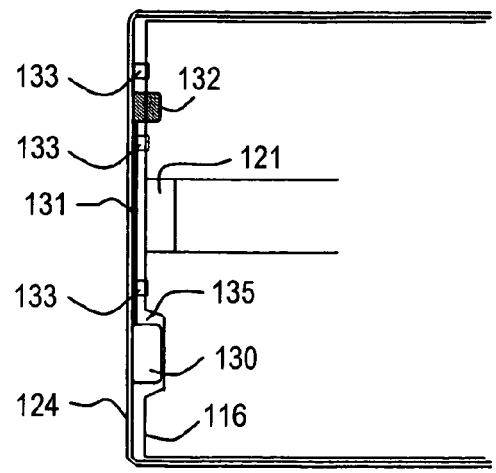

Next, the mounting of the ROM chip 130 and print wiring 131 onto the external packing film 124 will be described. FIGS. 5A and 5B are views in which the vicinity of the ROM chip 130 of the digital camera 100 in FIG. 1 is enlarged, and FIG. 5A shows its bottom surface, and FIG. 5B typically shows its A—A cross section.

On the camera side surface of the external film 124, the ROM chip 130 and the print wiring 131 are surface-mounted at the position covering the memory card insertion section 121. One end of the print wiring 131 is connected to the ROM chip 130, and the other end is connected to the external connecting terminal 132 provided on the casing 116 of the digital camera 100. In order to absorb the thickness of the ROM chip 130, it is preferable that a concave portion 135 is provided in the casing 116 of the digital camera 100. In the vicinity of the mounting positions of the ROM chip 130 and print wiring 131 on the external packing film 124, an adhered portion 133 adhered to the casing 116 of the digital camera 100 is provided. The adhered portion 133 is provided in the vicinity of the connection point to the external connecting terminal 132, for example, at the periphery of the external connecting terminal as shown in the drawing. Further, it is more preferable when it is provided also in the vicinity of the ROM chip 130, crossing the memory card insertion section 121.

As described above, when the ROM chip 130 is provided in the memory card insertion section 121, when the memory card 112 in which the picked up image information is stored is taken out after the photographing, the external packing film 124 is broken and even when the memory card 112 is mounted again and the digital camera 100 is tried to be operated, the operation can not be conducted.

Accordingly, because there is no merit that the memory card is taken out and used by the user itself, the carrying-in to the image processing service place such as a lab by the user of the digital camera 100 is promoted, and the withdrawal rate is increased. In that case, when a portion (for example, writing of the image information into the CD-ROM) of the processing by the carrying-in to the image processing service place such as a lab is made a service of charge of free, the withdrawal rate can be more increased. Further, it is also possible that, when the picked up image information to be stored in the memory card 112 is enciphered, the picked up image information can not be used without carrying-in to the image processing service place such as a lab.

In this connection, the adhering method is out of question when the adhering portion 133 is adhered onto the casing 116 of the digital camera 100 with the adhesive strength of the degree in which the external packing film 124 is broken when the external packing film is going to be stripped off. Further, when a perforation 134 is formed at the position covering the print wiring 131 of the external film 124, because it is easily broken, it is more preferable.

Figure 6:
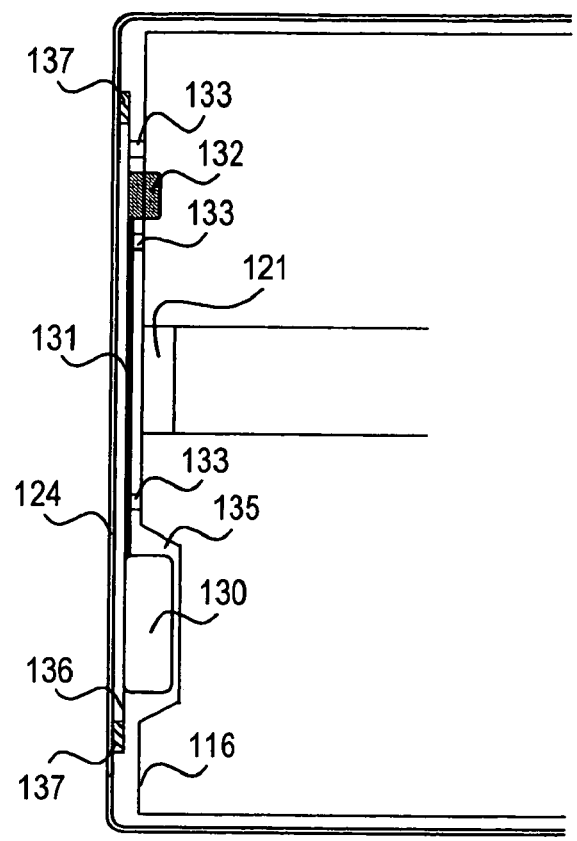
FIG. 6 is a view showing another example of a ROM chip mounting of the digital camera.

FIG. 6 is a view showing another mounting example of the ROM chip 130 and the print wiring 131, and is a view typically showing the cross section corresponding to FIG. 5B. The example of FIG. 6 is an example in which, instead of a case where the ROM chip 130 and the print wiring 131 are mounted on the external packing film surface 124, these are mounted on the mounting film 136. The mounting film 136 has the largeness and strength of the degree in which the ROM chip 130 and the print wiring 131 are surface-mounted, and the thinner material than the external packing film 124 is used. Then, the periphery of the mounting film 136 is adhered to the external packing film 124 by the adhesive agent 137.

The mounting of the ROM chip 130 and the print wiring 131 onto the mounting film 137 may be allowable at any time before or after the mounting film 137 is adhered to the external packing film 124. In the vicinity of the mounting position of the ROM 130 and the print wiring 131, a point in which the adhering portion 133 to be adhered to the casing 116 of the digital camera 100 is provided, is the same as in the example in FIGS. 5A and 5B. Further, a perforation is also provided at need. When such a mounting is conducted, the external packing film having an arbitrary strength can be selected without considering the easiness of the breakage when the film is stripped off, and it can be made the external packing film which is appropriate for an original function of the external packing film 124.

(The Second Embodiment)

Figure 7:
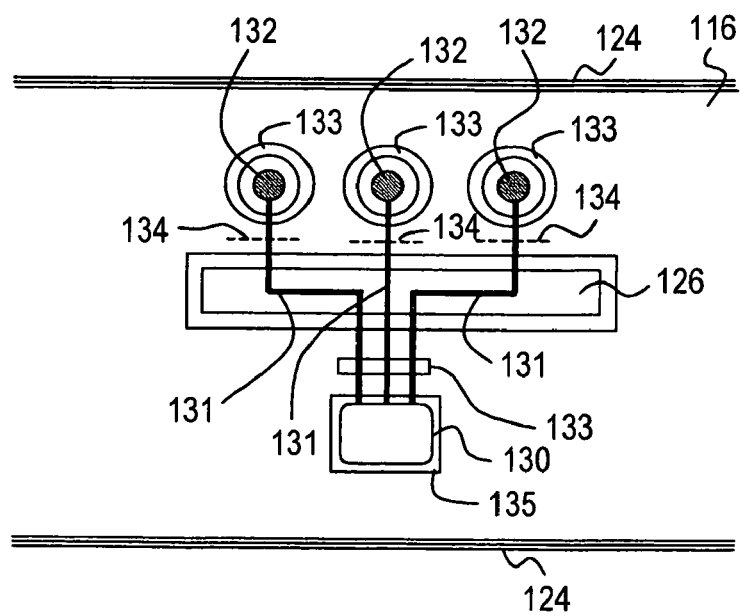
FIG. 7 is a view showing a bottom surface of the digital camera of the second embodiment.
Figure 8:
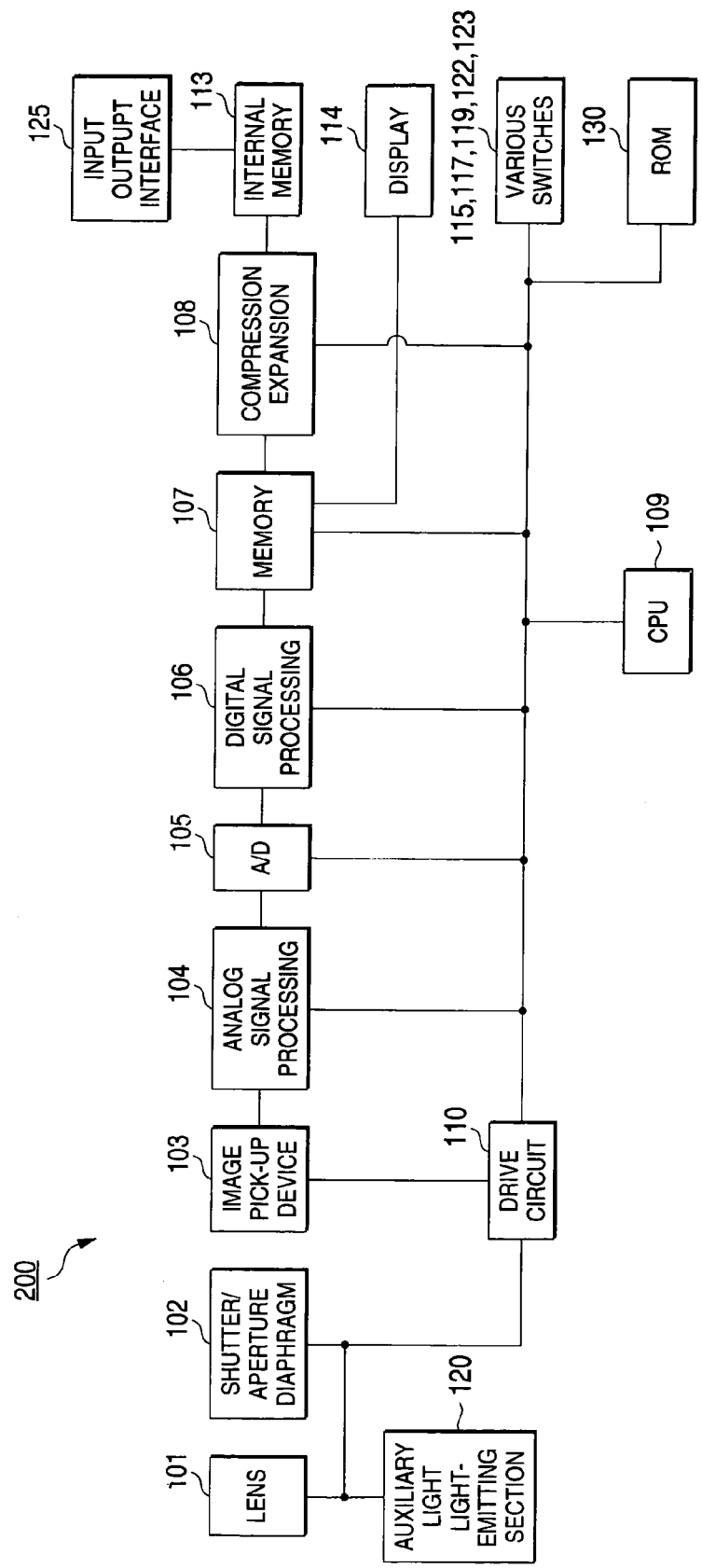
FIG. 8 is an outline block structural view of the digital camera of the second embodiment.

The digital camera 100 in FIG. 1 is a camera in which the picked up image information is stored in the removable recording medium such as a memory card, however, the digital camera 200 of the second embodiment is a camera in which the picked up image information is stored in the internal memory 113. FIG. 7 shows a bottom surface of the digital camera 200 of the second embodiment, and which is a view corresponding to FIG. 5A. Further, FIG. 8 is an outline block structural view of the digital camera 200.

The digital camera 200 has basically the same structure and function as the digital camera 100 except a point that the picked up image information is recorded in the internal memory 113 provided in the digital camera 200 inside in place of that it is recorded in the memory card 112 through the media interface 111, and a point that the picked up image information stored in the internal memory 113 is taken out to the outside through the input output interface 125.

The input output interface 125 includes a connector portion 126 formed on the bottom surface of the digital camera 200. On the position which covers the connector portion 126 of the external packing film 124, in the same manner as the digital camera 100, the ROM chip 130 and the print wiring 131 are mounted. One end of the print wiring 131 is connected to the ROM chip 130, and the other end is connected to the external connecting terminal 132 provided on the bottom surface of the digital camera 200.

Accordingly, when the external packing film 124 is stripped off in order to take out the picked up image information through the connector portion 126, the external packing film 124 and the print wiring 131 is broken, and when the memory card 112 is mounted again and the digital camera 200 is going to be operated, the operation of the digital camera is unable. The perforation 134 and the concave portion 135 of the ROM chip are provided at need. In this connection, the ROM chip 130 and the print wiring 131 can also be structured as a structure in which these are mounted on the mounting film in the same manner as in the example of FIG. 6.

As can clearly be seen from the above description, according to the present invention, a digital camera structured in such a manner that the digital camera can not be used after the taking out of the photographed digital image information so that the digital camera after a predetermined exposures of photographing can be surely withdrawn, can be provided. Then, consequently, the quality assurance of the photographed image can be attained.

What is claimed is:

1. A digital camera comprising a removable recording medium for recording a picked up image information, further comprising:

a ROM connected to an external connecting terminal of the digital camera and storing first identifying information;

an identifying information memory section which is provided inside of the digital camera and storing second identifying information;

a collating section for collating the first identifying information with the second identifying information; and an operation limiting section compulsorily stopping operation of the digital camera in a case a collating result by the collating section is not coincident with each other, and wherein the ROM is arranged in a condition that the connection to the external connecting terminal is broken in a case the removable recording medium is taken out.

2. A digital camera according to claim 1, further comprising:

an external packing film which covers at least a mounting portion of the removable recording medium; and a bare chip of the ROM and a wiring to the external connecting terminal are surface-mounted on the camera side surface of the external pacing film so that the mounting portion of the removable recording medium is covered; and wherein the external packing film has an adhered portion adhered to the digital camera surface in the vicinity of the mounting position of the bare chip and the wiring.

3. A digital camera according to claim 2, wherein the external packing film is structured in such a manner that at least one portion is more easily broken than other portion in the vicinity of the adhering section and in the vicinity of the mounting position of the wiring.

4. A digital camera according to claim 2, further comprising:

a mounting film which is thinner than the external packing film and by which the chip and wiring can be mounted, and wherein the mounting film is adhered to the external packing film;

wherein the bare chip of the ROM and the wiring to the external connecting terminal are mounted on the mounting film in place of the external packing film; and wherein the camera adhering section is provided on the mounting film in place of the external packing film.

5. A digital camera according to claim 1, wherein the second identifying information is read from the ROM, and is stored in the identifying information memory section after the digital camera is produced.

6. A digital camera according to claim 5, wherein, as the second identifying information to be stored, the first identifying information is utilized.

7. A digital camera according to claim 5, wherein the reading of the second identifying information from the ROM and storing into the identifying information memory section are conducted by using a predetermined program, and wherein the program is erased after the storing into the identifying information memory section.

8. A digital camera according to claim 7, wherein the ROM is an electrically erasable ROM, and wherein the program is previously stored in the ROM.

* * * * *